Patented June 30, 1925.

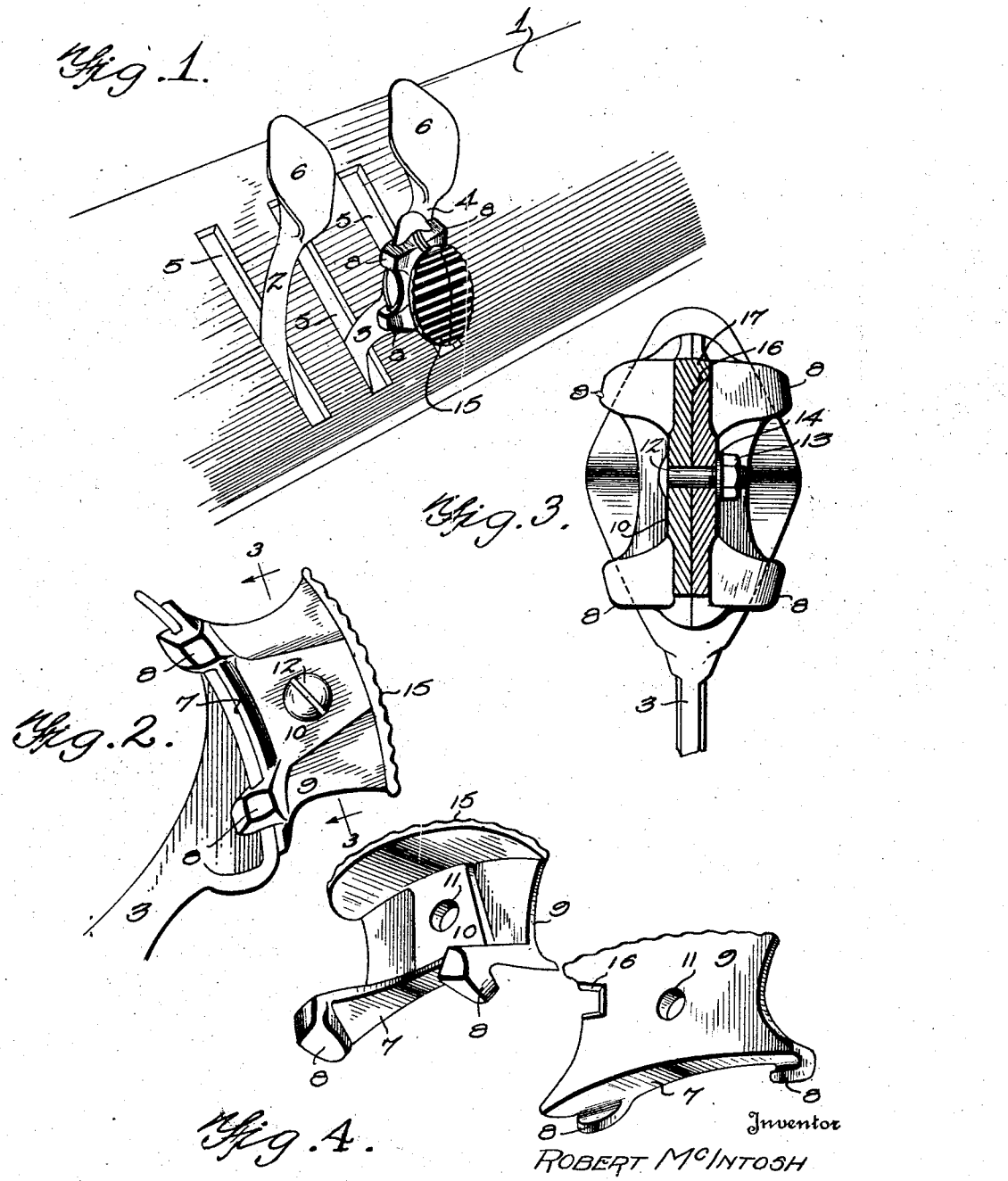

1,544,256

UNITED STATES PATENT OFFICE.

ROBERT McINTOSH, OF ASHLAND, OHIO.

ATTACHMENT FOR FOOT PEDALS.

Application filed August 20, 1924. Serial No. 733,163.

*To all whom it may concern:*

Be it known that I, ROBERT MCINTOSH, a citizen of the United States, residing at Ashland, in the county of Ashland and State of Ohio, have invented certain new and useful Improvements in Attachments for Foot Pedals, of which the following is a specification.

This invention relates to attachments for foot pedals, and more particularly to an extension for the foot pedals of a motor vehicle.

An object of the invention is to provide a two-part extension adapted to be arranged on one of the foot pedals of a motor vehicle, each part or section having means for engaging the top of the pedal whereby the connecting of the two parts to each other will clamp them on the pedal.

A further object of the invention is the provision of a device of this character in which one section is provided with a recess and the other section provided with a lug adapted to be received in said recess and serving as an auxiliary connecting means whereby the two sections may be secured to each other and retained in position on the pedal by a single bolt and nut.

In the accompanying drawings, I have shown one embodiment of the invention. In this showing:

Figure 1 is a perspective view of a portion of the floor board of a motor vehicle showing the invention applied, Figure 2 is a side elevation of one lever and foot pedal showing the invention applied, Figure 3 is a horizontal sectional view on line 3—3 of Figure 2, and, Figure 4 is a perspective view of the two sections of the attachment detached from the pedal and separated.

Referring to the drawings, the reference numeral 1 designates a portion of the floor board of a motor vehicle. The vehicle is of a well known type, employing planetary transmission and is provided with a forward speed lever 2, a reverse lever 3, and a brake lever 4, each of which pass through slots 5 in the floor board. The levers are provided with foot pedals 6 on their upper ends.

In the operation of a vehicle of this character, it is frequently difficult to operate the reverse gearing, due to the fact that the pedal must be moved forwardly in its slot 5 beyond the pedals arranged on each side thereof. The extension forming the subject matter of the invention is adapted to be placed on the reverse pedal so that the operator may apply his foot to the extension and move the lever forwardly in the slot 5 without the foot entering the space between the pedals on each side. As stated, the attachment or extension consists of a pair of sections, each of which is provided with a base portion 7, adapted to be received on top of the pedal. These base portions are provided with gripping fingers 8, at each end, which are adapted to engage the under side of the pedal and which, when the device is assembled, engage the pedal at the four corners of the extension (see Figure 3). Extending from the base portion of each section, there is provided a web 9 and these webs are provided with thickened portions 10, arranged substantially centrally thereof. The thickened portions are provided with openings 11 which are adapted to aline with each other and receive a bolt 12. A nut 13 is arranged on this bolt and a lock washer 14 may be arranged between the nut and the face of the adjacent web. The upper edges of the webs are provided with tread portions 15 which, as shown, may be roughened or corrugated to form a grip for the foot of the operator and prevent slipping, and is of the same shape as the pedal so that a multiple of extensions may be used to obtain any desired length.

The operation of the device will be apparent from the foregoing description. It is assembled by placing the sections on opposite sides of the pedal so that the gripping fingers 8 will engage the under face of the pedal and the sections are then moved toward each other and clamped by the bolt 12. One section may be provided with a notch or recess 16 in the web portion thereof and the other section provided with a lug 17 adapted to enter this notch. This serves as an auxiliary clamping means to assist the bolt 12 in retaining the sections in proper relation with respect to each other. By making the tread portion of the extension the same size as the pedal, any number of the extensions may be mounted on top of each other and extend the pedal any distance desired.

It is to be understood that the form of my invention herewith shown and described is to be taken as a preferred example of the same, and that various changes in the shape, size, and arrangement of parts may be resorted to without departing from the spirit of the invention or the scope of the subjoined claims.

I claim:

1. In a device of the character described, a pair of complementary sections, each of said sections comprising a base portion adapted to be arranged on top of a foot pedal, means carried by each of said sections adapted to engage said foot pedal, webs extending upwardly from said base portions, means for securing said webs to each other, and tread portions arranged on the upper ends of said webs.

2. In a device of the character described, a pair of complementary sections, each of said sections comprising a base portion adapted to be arranged on top of a foot pedal, gripping fingers carried by said base portions and adapted to engage the under surface of the foot pedal, webs extending upwardly from said base portions, means for securing said webs to each other, and tread portions arranged on the upper ends of said webs.

3. In a device of the character described, a pair of complementary sections, each of said sections comprising a base portion adapted to be arranged on top of a foot pedal, gripping fingers carried by said base portions and adapted to engage the under surface of the foot pedal, webs extending upwardly from said base portions, said webs being provided with alined openings, a fastening element adapted to be arranged in said openings, and tread portions arranged on the upper ends of said webs.

4. In a device of the character described, a pair of complementary sections, each of said sections comprising a base portion adapted to be arranged on top of a foot pedal, gripping fingers carried by said base portions and adapted to engage the under surface of the foot pedal, webs extending upwardly from said base portions, said webs being provided with alined openings for the reception of a fastening element, one of said webs being provided with a recess, a lug formed on the other web, and adapted to enter said recess, and tread portions formed on the upper ends of said webs.

In testimony whereof, I affix my signature in presence of two witnesses.

ROBERT McINTOSH.

Witnesses:
  CLYDE C. SHEUCH,
  EDGAR KOEHL.